(12) United States Patent
Iwaya et al.

(10) Patent No.: US 11,960,080 B2
(45) Date of Patent: Apr. 16, 2024

(54) HEAD-UP DISPLAY DEVICE

(71) Applicant: NIPPON SEIKI CO., LTD., Niigata (JP)

(72) Inventors: Takaharu Iwaya, Niigata (JP); Chiaki Shibuya, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 18/248,451

(22) PCT Filed: Oct. 19, 2021

(86) PCT No.: PCT/JP2021/038518
§ 371 (c)(1),
(2) Date: Apr. 10, 2023

(87) PCT Pub. No.: WO2022/085658
PCT Pub. Date: Apr. 28, 2022

(65) Prior Publication Data
US 2023/0367119 A1    Nov. 16, 2023

(30) Foreign Application Priority Data
Oct. 20, 2020    (JP) ................................. 2020-175834

(51) Int. Cl.
*G02B 27/01*    (2006.01)
*B60K 35/00*    (2006.01)
(Continued)

(52) U.S. Cl.
CPC .......... *G02B 27/0101* (2013.01); *B60K 35/00* (2013.01); *G02B 3/005* (2013.01);
(Continued)

(58) Field of Classification Search
CPC .......................... G02B 27/0101; G02B 3/005; G02B 27/0966; G02B 27/30; B60K 35/00; B60K 2370/1529; G02F 1/133553
See application file for complete search history.

(56) References Cited

U.S. PATENT DOCUMENTS 11,262,579 B1 *    3/2022    Vinogradov ............. G02B 7/02
2005/0219464 A1 *    10/2005    Yamasaki .......... G03B 21/2073
348/E9.027
(Continued)

FOREIGN PATENT DOCUMENTS

JP    2009-192789 A    8/2009
WO    2008/114502 A1    9/2008
(Continued)

OTHER PUBLICATIONS

International Search Report issued in corresponding International Application No. PCT/JP2021/038518, dated Dec. 28, 2021, w/ English Translation (5 pages).

*Primary Examiner* — Dmitriy Bolotin
(74) *Attorney, Agent, or Firm* — Rimon P.C.

(57) ABSTRACT

Provided is a head-up display device capable of reducing the divergence angle of display light which has passed a cross point. A head-up display device comprises: a light source that emits light beams; a liquid crystal panel that emits display light beams upon reception of the light beams from the light source; a first mirror that reflects the display light beams from the liquid crystal panel and causes the reflected display light beams to cross at a cross point in a crossing direction; a second mirror that reflects the display light beams reflected on the first mirror and passed through the cross point; and a second lenticular lens that converges the light beams from the light source and causes the display light beams to reach the first mirror in the converged state.

2 Claims, 8 Drawing Sheets

(51) Int. Cl.
  *G02B 3/00* (2006.01)
  *G02B 27/09* (2006.01)
  *G02B 27/30* (2006.01)
  *G02F 1/1335* (2006.01)
  *B60K 35/23* (2024.01)

(52) U.S. Cl.
  CPC ......... *G02B 27/0966* (2013.01); *G02B 27/30* (2013.01); *G02F 1/133553* (2013.01); *B60K 35/23* (2024.01)

(56) References Cited

U.S. PATENT DOCUMENTS

| | | | |
|---|---|---|---|
| 2010/0053565 A1 | 3/2010 | Mizushima et al. | |
| 2013/0258216 A1* | 10/2013 | Shiue | G03B 21/005 349/9 |
| 2017/0315352 A1* | 11/2017 | Hardy | G02B 26/0833 |
| 2018/0039077 A1* | 2/2018 | Kuzuhara | G02B 27/01 |
| 2018/0101007 A1* | 4/2018 | Asai | G02B 27/0093 |
| 2018/0259773 A1* | 9/2018 | Asai | G02B 6/0038 |
| 2019/0121128 A1* | 4/2019 | Kasahara | B60K 35/00 |
| 2019/0390836 A1* | 12/2019 | Hirata | B60Q 1/143 |
| 2020/0011501 A1* | 1/2020 | Kunii | F21V 7/22 |
| 2020/0166751 A1* | 5/2020 | Gotoh | B60K 35/00 |
| 2022/0075189 A1* | 3/2022 | Hirata | G02B 27/0101 |
| 2022/0163813 A1* | 5/2022 | Huang | H01L 33/60 |
| 2023/0118416 A1* | 4/2023 | Hirata | G02B 5/30 359/630 |

FOREIGN PATENT DOCUMENTS

| | | |
|---|---|---|
| WO | 2017/183556 A1 | 10/2017 |
| WO | 2018/198821 A1 | 11/2018 |

* cited by examiner

HEAD-UP DISPLAY DEVICE

CROSS REFERENCE TO RELATED APPLICATIONS

This application is the U.S. National Phase under 35 U.S.C. § 371 of International Application No. PCT/JP2021/038518, filed on Oct. 19, 2021, which claims the benefit of Japanese Application No. 2020-175834, filed on Oct. 20, 2020, the entire contents of each are hereby incorporated by reference.

TECHNICAL FIELD

The present disclosure relates to a head-up display device.

BACKGROUND ART

For example, a head-up display device described in Patent Document 1 includes a display that emits display light, a first mirror that reflects the display light emitted by the display, and a second mirror that reflects the display light reflected at the first mirror. The first mirror causes the reflected display light to cross in an up-down direction at a cross point before the reflected display light reaches the second mirror.

PRIOR ART DOCUMENT

Patent Document

Patent Document 1: WO 2018/198821

SUMMARY OF THE INVENTION

Problems to be Solved by the Invention

In a configuration described in Patent Document 1 described above, the display light emitted from the display is parallel light, and therefore, the display light that has passed the cross point diverges at a large divergent angle. Therefore, a large reflecting surface of the second mirror is needed.

In view of the actual situation as described above, the present disclosure has been devised and it is an object of the present disclosure is to provide a head-up display device that can reduce a divergent angle of display light that has passed a cross point.

Solution to Problem

In order to achieve the above-described object, a head-up display device of the present disclosure includes a light source that emits light, a liquid crystal panel that receives the light from the light source and emits display light, a first mirror that reflects the display light from the liquid crystal panel and causes the reflected display light to cross in a crossing direction at a cross point, a second mirror that reflects the display light that has been reflected at the first mirror and has passed the cross point, and a first optical element that converges light from the light source to cause the display light to reach the first mirror in a converged state.

Effect of the Invention

According to the present disclosure, in the head-up display device, the divergent angle of the display light that has passed the cross point can be reduced.

MODE FOR CARRYING OUT THE INVENTION

One embodiment of a head-up display device according to the present disclosure will be described with reference to the accompanying drawings.

Figure 1:
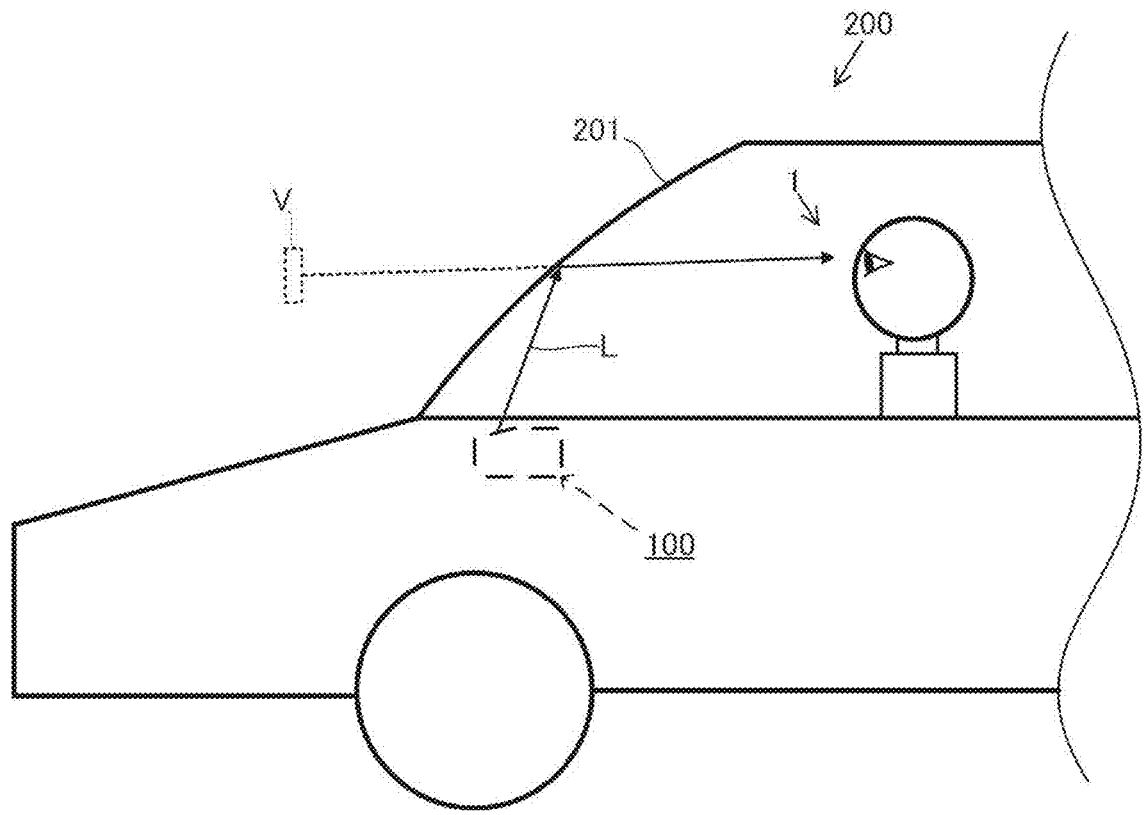
FIG. 1 is a schematic diagram of a vehicle according to one embodiment of the present disclosure.

As illustrated in FIG. 1, a head-up display device 100 is mounted on a vehicle 200 and displays a virtual image V including vehicle information by projecting display light L onto a windshield 201 that is a projection target member so that the virtual image V is visible to a viewer 1.

Figure 2:
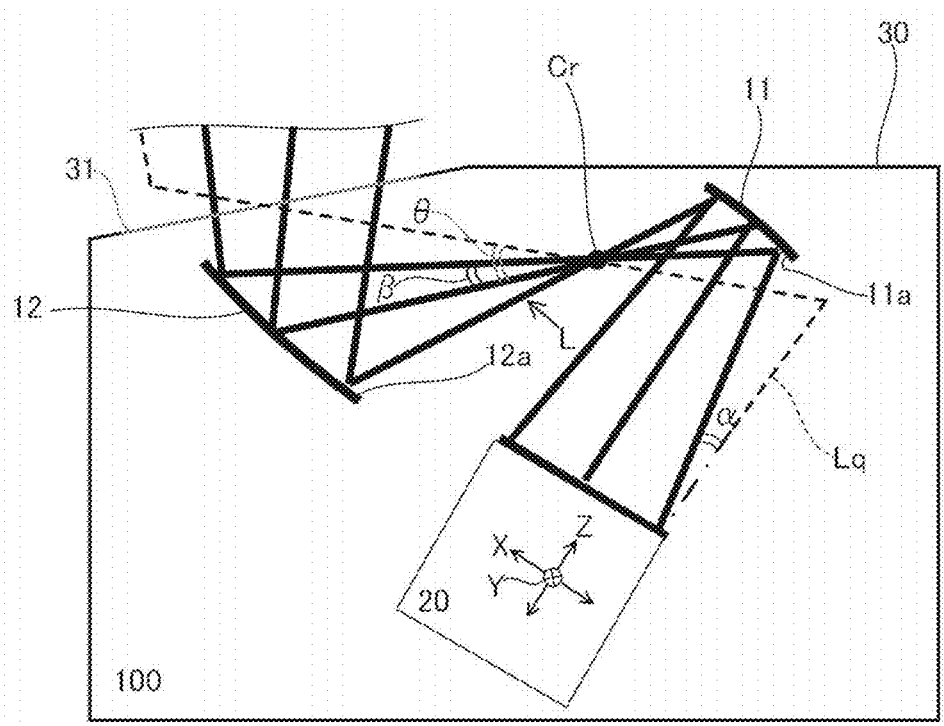
FIG. 2 is a schematic diagram of a head-up display device according to one embodiment of the present disclosure.

As illustrated in FIG. 2, the head-up display device 100 includes a first mirror 11, a second mirror 12, a display unit 20, and a case 30.

The case 30 is formed of light-shielding resin or metal into a box shape. The first mirror 11, the second mirror 12, and the display unit 20 are housed in the case 30.

The case 30 includes a translucent window material 31 that transmits the display light L reflected at the second mirror 12 toward the windshield 201 (see FIG. 1). The translucent window material 31 is formed of translucent resin or glass into a plate shape and is positioned to correspond to the windshield 201 in a height direction of the vehicle 200.

The display unit 20 emits the display light L as convergent light that converges toward the first mirror 11. A convergent angle α of the display light L emitted from the display unit 20 is an angle made by a light beam at a position most distant from center of an optical axis with respect to the center of the optical axis. The display light L emitted from the display unit 20 converges in the height direction (crossing direction) of the vehicle 200 and is in parallel in the width direction of the vehicle 200.

A specific configuration of the display unit 20 will be described later.

As illustrated in FIG. 2, the first mirror 11 is a concave mirror that is curved along the height direction of the vehicle 200 and linearly extends along the width direction of the vehicle 200. The first mirror 11 reflects the display light L emitted from the display unit 20 toward the second mirror 12.

The first mirror 11 reflects the display light L from the display unit 20 toward the second mirror 12 so that the display light L crosses at a cross point Cr in the height direction of the vehicle 200. The cross point Cr is located between the first mirror 11 and the second mirror 12 in an optical path of the display light L. The cross point Cr is provided closer to the first mirror 11 than an intermediate position between the first mirror 11 and the second mirror 12. The display light L converges from the first mirror 11 to the cross point Cr and diverges from the cross point Cr to the second mirror 12 at a divergent angle β. The divergent angle β is an angle made by a light beam at a position most distant from center of an optical axis of the display light L from the cross point Cr to the second mirror 12 with respect to the center of the optical axis.

The reflecting surface 11a of the first mirror 11 faces downward toward front of the vehicle 200.

The second mirror 12 is a concave mirror that is curved along the height direction of the vehicle 200 and linearly extends along the width direction of the vehicle 200. The second mirror 12 reflects the display light L reflected from the first mirror 11 toward the windshield 201 (see FIG. 1). The second mirror 12 reflects the display light L from the first mirror 11 toward the windshield 201 so that the display light L diverges. The reflecting surface 12a of the second mirror 12 faces upward toward rear of the vehicle 200.

Next, a specific configuration of the display unit 20 will be described.

Figure 3:
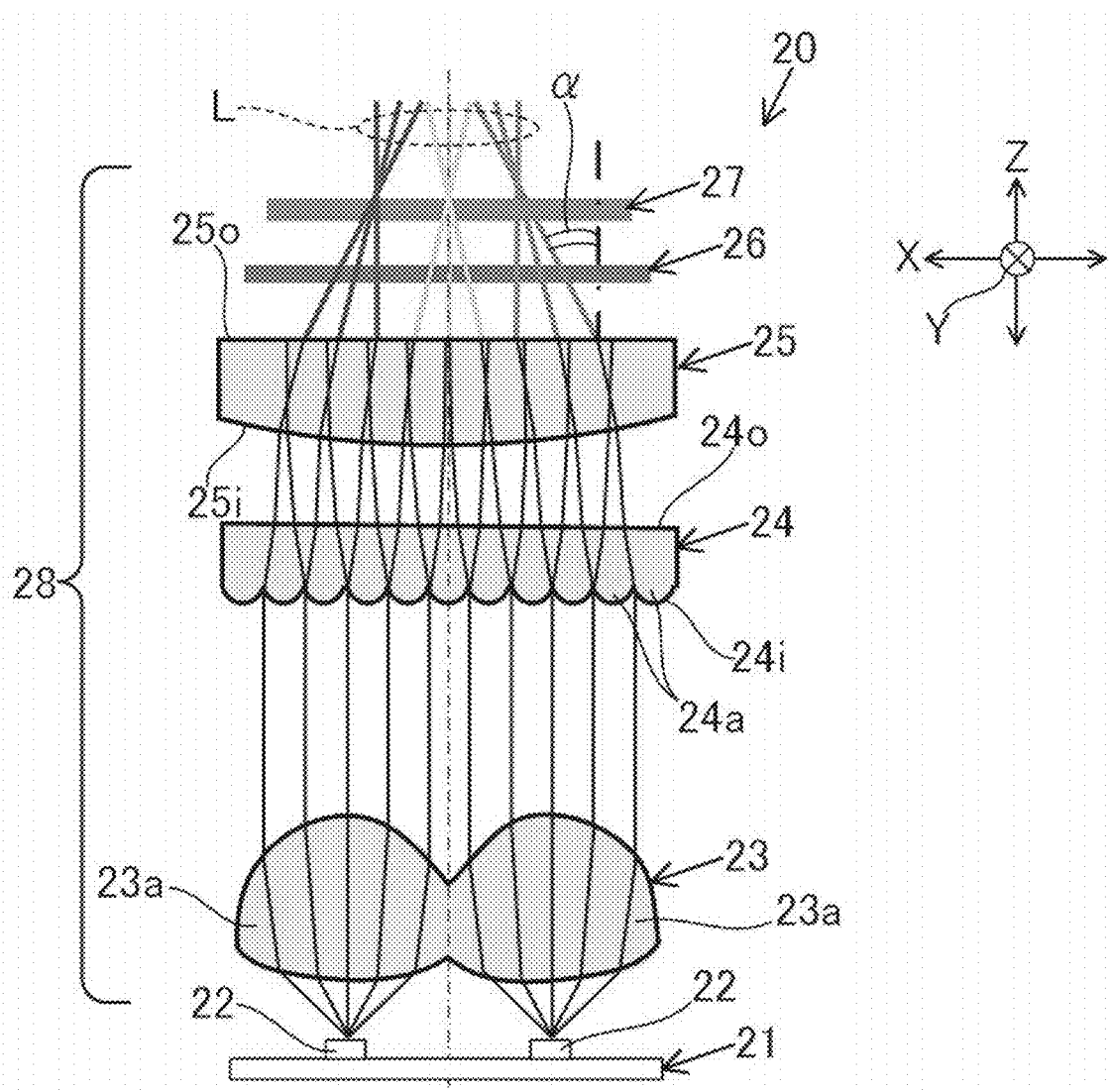
FIG. 3 is a side view of a display unit illustrating a light path according to one embodiment of the present disclosure.
Figure 4:
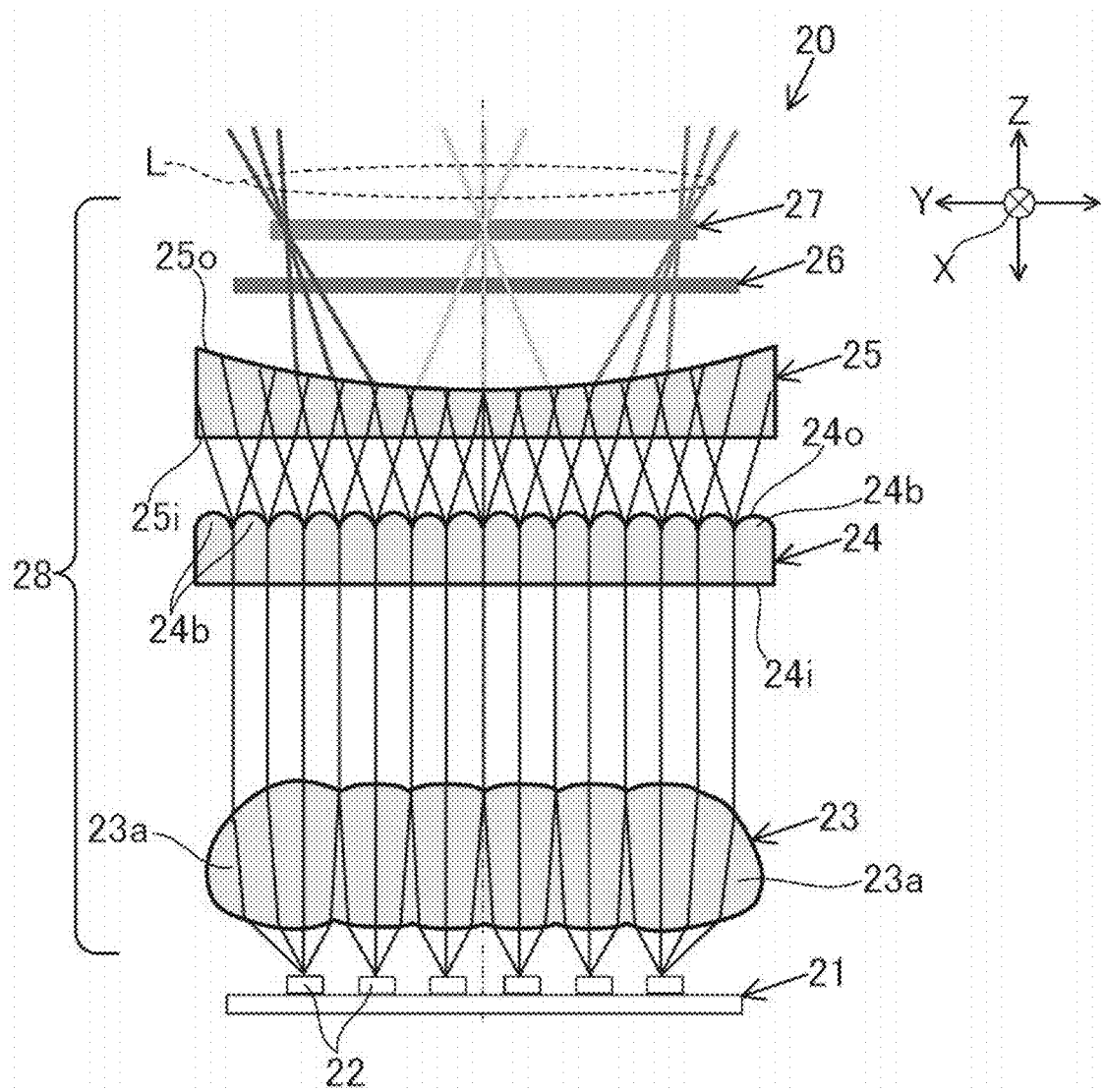
FIG. 4 is a plan view of a display unit illustrating a light path according to one embodiment of the present disclosure.

As illustrated in FIG. 3 and FIG. 4, the display unit 20 includes a light source substrate 21, a plurality of light sources 22, and a lighting optical system 28 that adjusts illumination light from the light sources 22. The lighting optical system 28 adjusts the illumination light from light source 22. Adjustment of the illumination light refers to collimation, diffusion, scattering, or convergence of illumination light.

The lighting optical system 28 includes a condenser lens 23, a first lenticular lens 24, a second lenticular lens 25, a diffuser 26, and a liquid crystal panel 27.

In the following description, a direction along the optical axis of the illumination light emitted from the light source 22 is defined as a Z direction, and directions orthogonal to the Z direction are defined as an X direction and a Y direction. The X direction and the Y direction are orthogonal to each other. In this example, the X direction is along a short direction of the first lenticular lens 24 or the like and the Y direction is along a longitudinal direction of the first lenticular lens 24 or the like. There is a cross point Cr (see FIG. 1) where the display light L crosses in a cross plane along the X direction and the Z direction. The cross surface is along a height direction of a vehicle and a front-to-rear direction of the vehicle.

The light source substrate 21, the condenser lens 23, the first lenticular lens 24, the second lenticular lens 25, the diffuser 26, and the liquid crystal panel 27 are aligned along the Z direction so that respective thicknesses thereof are along the Z direction and are housed in a housing cylinder portion (not illustrated) formed by light-shielding resin.

The light source 22 emits illumination light under control by an unillustrated control unit. The light source 22 is, for example, a light emitting diode (LED). A plurality of light sources 22 are mounted on a main surface of the light source substrate 21. The main surface of the light source substrate 21 is a surface facing the condenser lens 23 of the light source substrate 21. A plurality of light sources 22 are arranged in a matrix of two rows and six columns on the main surface of the light source substrate 21.

The condenser lens 23 is formed of translucent resin or glass into a plate shape. The condenser lens 23 has a function to substantially collimate each light beam of illumination light emitted from each light source 22 by aligning the light beams along the Z direction.

The condenser lens 23 includes a plurality of convex lens portions 23a that are aligned in the X and Y directions. Each of the convex lens portions 23a is formed in a biconvex lens shape. The plurality of convex lens portions 23a are arranged in a matrix of two rows and six columns, each corresponding to a corresponding one of the plurality of light sources 22.

The first lenticular lens 24 is formed of translucent resin or glass into a plate shape. For further detail, the first lenticular lens 24 includes an incident surface 24i that light enters and a light emitting surface 24o from which light that has passed through the first lenticular lens 24 in the thickness direction thereof is emitted. The incident surface 24i of the first lenticular lens 24 is a surface facing the condenser lens 23. The light emitting surface 24o of the first lenticular lens 24 is a surface facing the second lenticular lens 25.

As illustrated in FIG. 3, a plurality of (eleven in this example) cylindrical lens portions 24a are formed on the incident surface 24i of the first lenticular lens 24. Each of the plurality of cylindrical lens portions 24a extends in a semi-cylindrical shape extending in the Y direction and the cylindrical lens portions 24a are arranged in a form of a cylindrical lens array along the X direction. The incident surface 24i of the second lens 24 has a function to diverge light in the X direction to suppress occurrence of uneven light intensity in the X direction by the cylindrical lens portion 24a.

As illustrated in FIG. 4, a plurality of (16 in this example) cylindrical lens portions 24b are formed on the light emitting surface 24o of the first lenticular lens 24. Each of the plurality of cylindrical lens portions 24b extends in a semi-cylindrical shape extending in the X direction and the cylindrical lens portions 24b are arranged in a form a cylindrical lens array along the Y direction. The light emitting surface 24o of the second lens 24 has a function to diverge light in the Y direction to suppress occurrence of uneven light intensity in the Y direction by the cylindrical lens portion 24b.

The cylindrical lens portions 24a and 24b are arranged in directions crossing each other. Based on a pitch and a curvature radius of each of the cylindrical lens portions 24a and 24b, the divergent angle of light can be adjusted.

The second lenticular lens 25 is formed of translucent resin or glass into a plate shape. For further detail, the second lenticular lens 25 includes an incident surface 25i that light enters and a light emitting surface 25o from which light that has passed through interior of the second lenticular lens 25 in a thickness direction thereof is emitted. The incident surface 25i of the second lenticular lens 25 is a surface facing the first lenticular lens 24. The light emitting surface 25o of the second lenticular lens 25 is a surface facing the diffuser 26.

As illustrated in FIG. 3, the incident surface 25i of the second lenticular lens 25 is formed as a convex curved surface (cylindrical surface) along the X direction. The incident surface 25i of the second lenticular lens 25 has a function to converge the illumination light as convergent light in the X direction. The illumination light and the convergent angle α of the display light L are determined by a curvature radius of the light emitting surface 25o. The convergent angle α of the light emitting surface 25o is set to an angle that allows the illumination light from the light emitting surface 25o to pass through the liquid crystal panel 27 and reach the first mirror 11 (see FIG. 2) as the display light L still in a form of converged light.

As illustrated in FIG. 4, the light emitting surface 25o of the second lenticular lens 25 is formed as a concave curved surface (cylindrical surface) along the Y direction. The light emitting surface 25o of the second lenticular lens 25 has a function to diverge the illumination light as divergent light in the Y direction.

The diffuser 26 is a diverging plate or a diffusing plate that suppresses occurrence of uneven light intensity, scatters the illumination light that has passed through the second lenticular lens 25, and then emits the illumination light toward the liquid crystal panel 27.

The liquid crystal panel 27 is a thin film transistor (TFT) type liquid crystal display panel. The liquid crystal panel 27 receives illumination light that has passed through the diffuser 26 and emits the display light L under control by the unillustrated control unit.

Next, an action of the light emitted from each of the light sources 22 will be described.

As illustrated in FIG. 3 and FIG. 4, the illumination light emitted from each of the light sources 22 is substantially collimated in the X direction and the Y direction by passing through the condenser lens 23 so that light beams extend in the Z direction. The illumination light that has passed through the condenser lens 23 enters the incident surface 24i of the first lenticular lens 24 and is emitted from the light emitting surface 24o. As illustrated in FIGS. 3 and 4, the first lenticular lens 24 diverges the illumination light that has passed through the condenser lens 23 in the X direction and the Y direction by the cylindrical lens portions 24a and 24b. Thus, unevenness of light intensity in the X direction and the Y direction is reduced.

The illumination light that has passed through the first lenticular lens 24 enters the incident surface 25i of the second lenticular lens 25 and is emitted from the light emitting surface 25o. As illustrated in FIG. 3, the second lenticular lens 25 converges the illumination light in the X direction by the incident surface 25i having a convex lens shape, that is, orients the illumination light so that the illumination light goes toward the center of the optical axis as the illumination light travels. As illustrated in FIG. 4, the second lenticular lens 25 diverges the illumination light in the Y direction by the light emitting surface 25o having a concave lens shape, that is, orients the illumination light so that the illumination light goes away from the center of the optical axis as the illumination light travels.

The illumination light that has passed through the second lenticular lens 25 is scattered by the diffuser 26 and then illuminates the liquid crystal panel 27. The liquid crystal panel 27 receives the illumination light that has passed through the diffuser 26 and emits the display light L. The display light L emitted from the liquid crystal panel 27 is converged in the X direction by the incident surface 25i of the second lenticular lens 25 and is diverged in the Y direction by the light emitting surface 25o of the second lenticular lens 25. As illustrated in FIG. 2, the display light L that converges in the X direction is reflected at the first mirror 11, heads toward the second mirror 12 while maintaining a converged state, and reaches the second mirror 12 in a diverged state after crossing at the cross point Cr. On the other hand, the display light L that diverges in the Y direction is reflected at the first mirror 11 and reaches the second mirror 12 while maintaining a diverged state. The display light L is then reflected at the second mirror 12 toward the windshield 201 (see FIG. 1). The display light L reflected at the windshield 201 reaches the viewer 1, and thus, the viewer 1 can view the virtual image V.

Advantageous Effects

According to the embodiment described above, the following advantageous effects are achieved.

(1) The head-up display device 100 includes a light source 22 that emits light, the liquid crystal panel 27 that receives the light from the light source 22 and emits the display light L, the first mirror 11 that reflects the display light L from the liquid crystal panel 27 and causes the reflected display light L to cross in the crossing direction (the height direction of the vehicle 200) at the cross point Cr, the second mirror 12 that reflects the display light L that has been reflected at the first mirror 11 and has passed the cross point Cr, and the second lenticular lens 25 that is an example of a first optical element that converges light from the light source 22 to cause the display light L to reach the first mirror 11 in a converged state.

According to this configuration, the display light L emitted from the liquid crystal panel 27 reaches the first mirror 11 in a converged state. Therefore, the divergent angle β of the display light L that has passed the cross point Cr can be reduced. Thus, a size of the second mirror 12 can be reduced. This advantageous effect will be specifically described below. For example, in a comparative example where display light emitted from a liquid crystal panel is parallel light, a light beam path Lq located at an outer edge of a plane perpendicular to the optical axis of the display light indicated by a broken line in FIG. 2 is located outside of the display light L in the configuration described above. The divergent angle θ of the display light that has passed the cross point Cr in the comparative example is larger than the divergent angle β of the display light L in the configuration described above. Therefore, in the comparative example, in order to enable reflection of the display light, it is necessary to increase sizes of the first mirror and the second mirror. In this respect, in the configuration described above, the divergent angle β of the display light L that has passed the cross point Cr is reduced, and thus, the sizes of the first mirror 11 and the second mirror 12, and furthermore, a size of the head-up display device 100 can be reduced.

(2) The second lenticular lens 25 includes the incident surface 25i that is an example of a convex lens surface that has positive power and converges the light from the light source 22.

According to this configuration, the convex lens surface of the second lenticular lens 25 can converge the light from the light source 22.

(3) The head-up display device 100 further includes the condenser lens 23 that is an example of a second optical element that substantially collimates light emitted from the light source 22 and the first lenticular lens 24 that is an example of a third optical element that diverges the light substantially collimated by the condenser lens 23 and then emits the substantially collimated light to the second lenticular lens 25.

According to this configuration, the light emitted from the light source 22 is substantially collimated by the condenser lens 23 and is diverged by the first lenticular lens 24. As described above, the light is adjusted before reaching the second lenticular lens 25.

(4) The incident surface 24i and the light emitting surface 24o of the first lenticular lens 24 are formed in a cylindrical lens array shape including the cylindrical lens portions 24a and 24b extending in mutually intersecting directions.

According to this configuration, one first lenticular lens 24 diffuses light so that unevenness of light intensity is suppressed in two directions (for example, the X direction and the Y direction).

(5) The light emitting surface 25o of the second lenticular lens 25 is formed as a concave curved surface along the Y direction. As compared to this configuration, in a configuration of the comparative example where the incident surface 25i is formed as a concave curved surface along the Y direction, both ends of the incident surface 25i of the second lenticular lens 25 in the Y direction are not in contact with the first lenticular lens, and therefore, there is a probability that a distance between the first lenticular lens and the second lenticular lens is large. In this respect, in the configuration described above, the light emitting surface 25o of the second lenticular lens 25 is formed as a concave curved surface along the Y direction, and thus, the distance between the first lenticular lens 24 and the second lenticular lens 25 can be made small.

The present disclosure is not limited to the embodiment described above and the drawings. Variations (including deletion of components) can be made as appropriate in a range in which the scope of this disclosure is not changed. Examples of variations will be described below.

Variations

In the embodiment described above, the display light L crosses in the height direction of the vehicle 200 but, instead of or in addition to this configuration, the display light L may cross in a width direction of the vehicle 200. In this case, the reflecting surface 11a of the first mirror 11 is formed in a concave curved shape along the width direction of the vehicle 200.

Configurations of the condenser lens 23, the first lenticular lens 24, and the second lenticular lens 25 in the embodiment described above can be changed as appropriate. First to third variations will be described below. The first to third variations will be described with focus on differences from the embodiment described above.

First Variation

Figure 5:
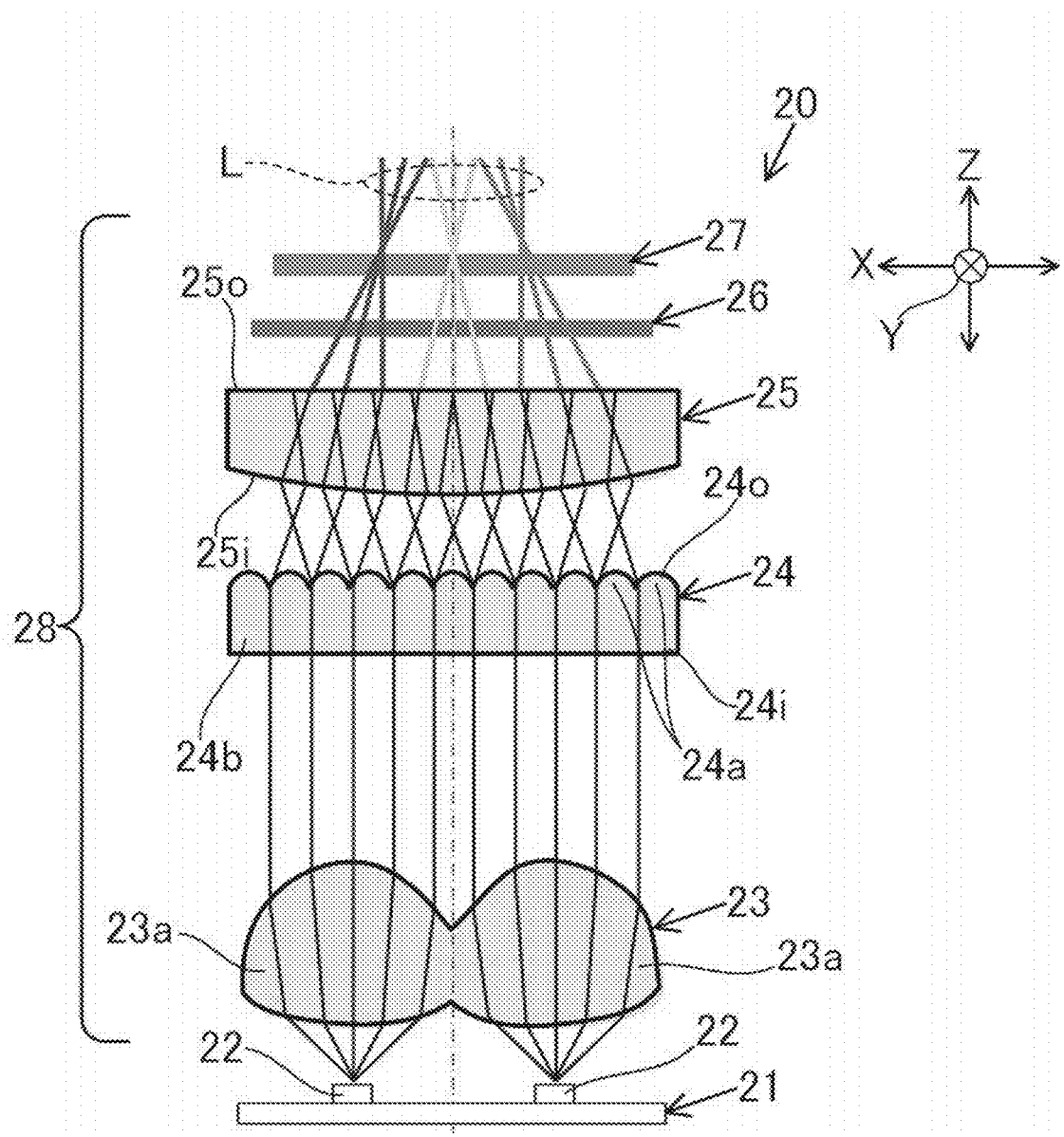
FIG. 5 is a side view of a display unit illustrating a light path according to a variation of the present disclosure.
Figure 6:
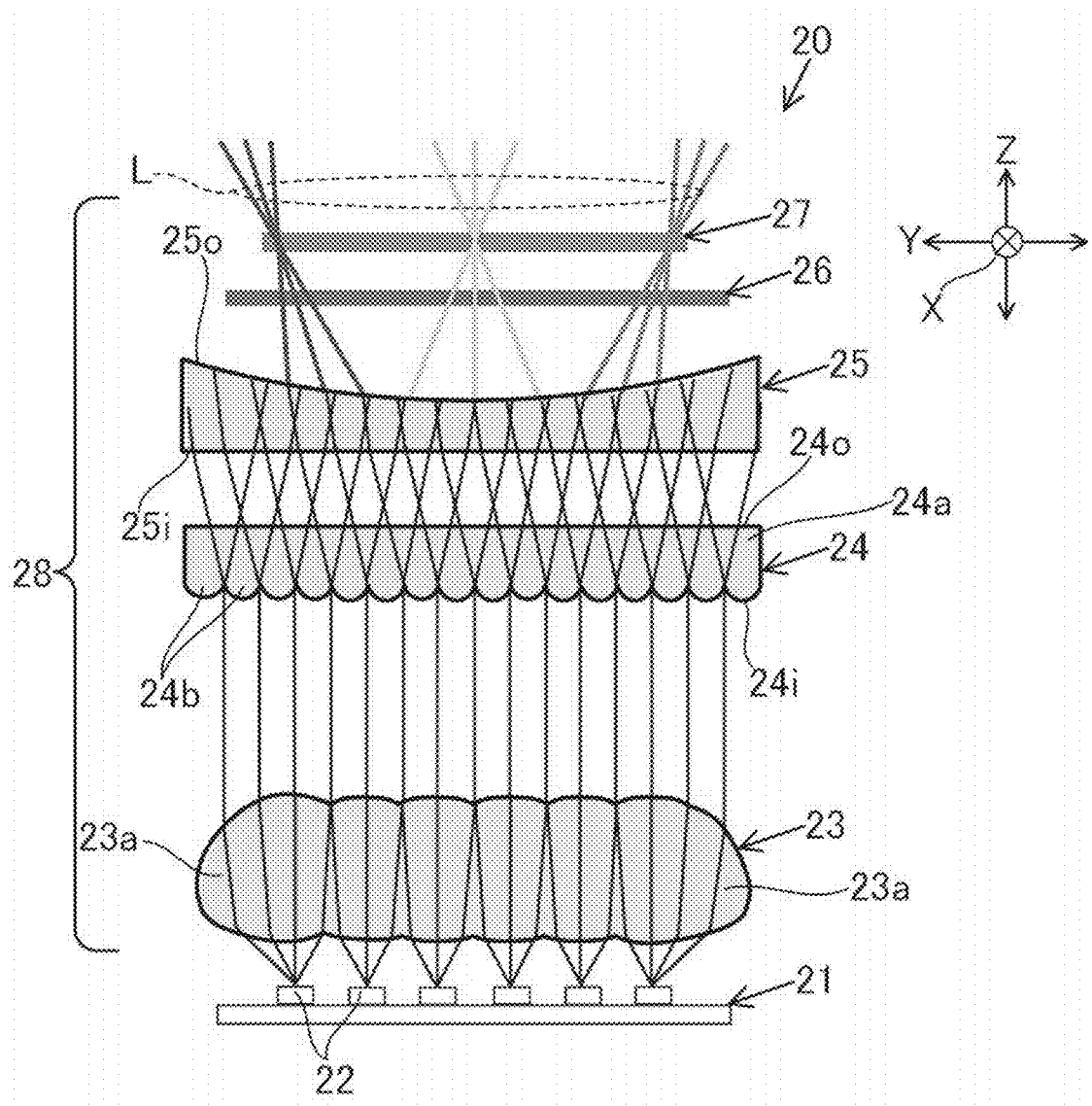
FIG. 6 is a plan view of the display unit illustrating the light path according to the variation of the present disclosure.

First, a first variation will be described. As illustrated in FIG. 5, a plurality of cylindrical lens portions 24a may be formed on the light emitting surface 24o of the first lenticular lens 24 and, as illustrated in FIG. 6, a plurality of cylindrical lens portions 24b may be formed on the incident surface 24i of the first lenticular lens 24. That is, the first lenticular lens 24 in the embodiment described above is reversed so that the incident surface 24i and the light emitting surface 24o of the first lenticular lens 24 are reversely arranged, thus constituting a first variation. Also in this case, the first lenticular lens 24 can diffuse the illumination light in the X direction and the Y direction, similar to the embodiment described above.

Second Variation

Figure 7:
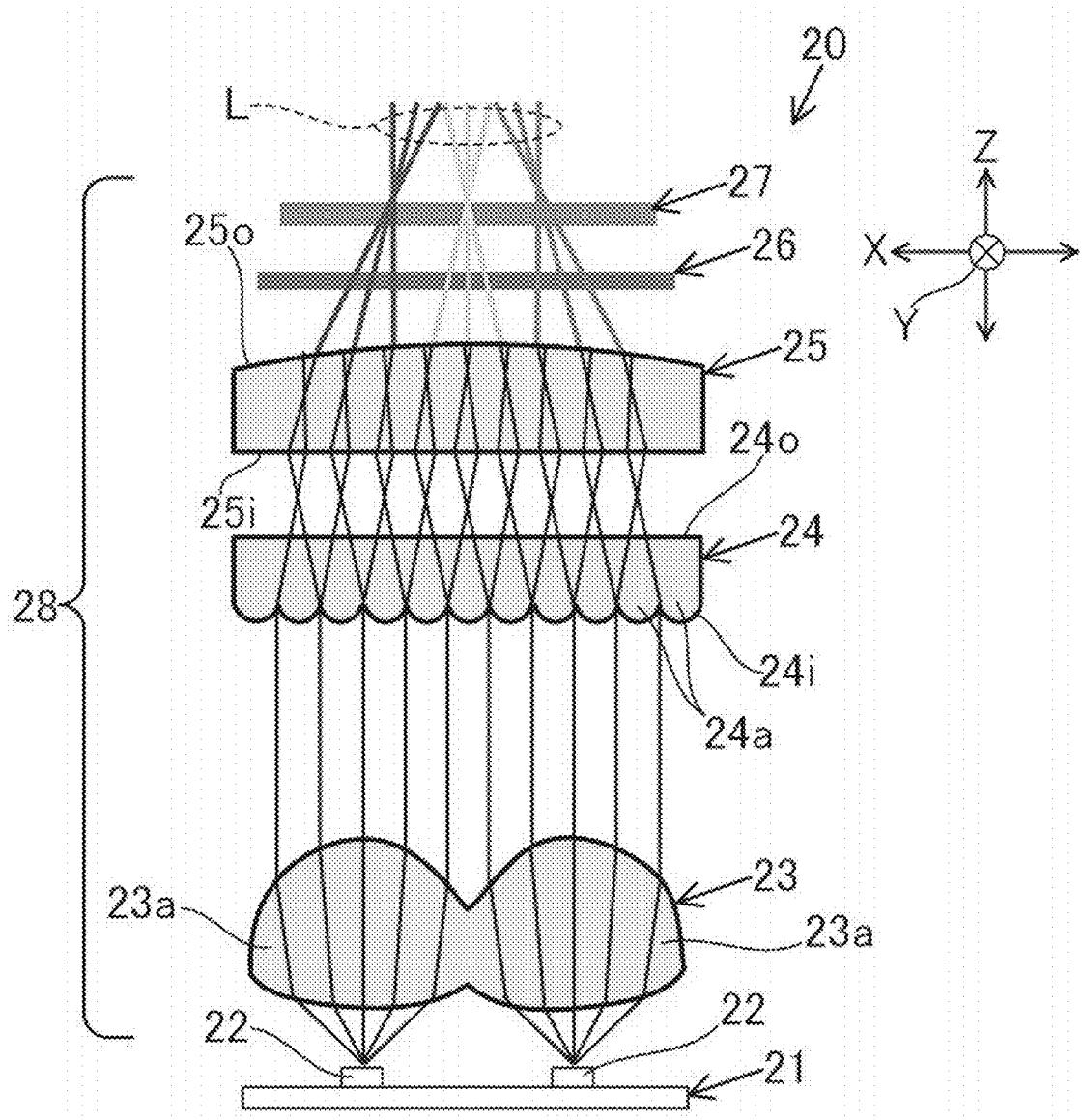
FIG. 7 is a side view of a display unit illustrating a light path according to another variation of the present disclosure.

Next, a second variation will be described. As illustrated in FIG. 7, the incident surface 25i of the second lenticular lens 25 may be formed in a planar shape along the X direction and the Y direction and the light emitting surface 25o of the second lenticular lens 25 may be formed as a convex curved surface along the X direction. In this case, the light emitting surface 25o of the second lenticular lens 25 is formed as a toroidal surface that is curved convexly along the X direction and is concavely curved along the Y direction. In this configuration, similar to the incident surface 25i of the embodiment described above, the light emitting surface 25o of the second lenticular lens 25 converges the illumination light as convergent light in the X direction and, in addition to this convergence, diverges the illumination light as divergent light in the Y direction.

Third Variation

Figure 9:
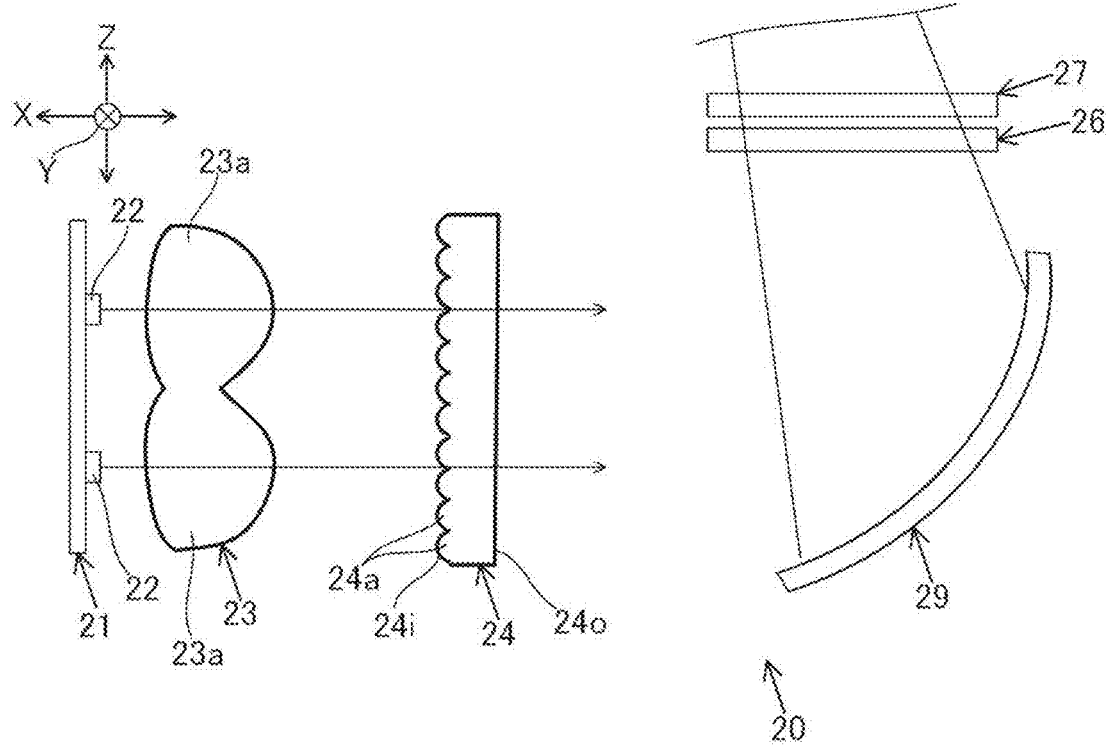
FIG. 9 is a side view of a display unit illustrating a light path according to still another variation of the present disclosure.

Next, a third variation will be described. Instead of the second lenticular lens 25 in the embodiment described above, a concave mirror 29 that is an example of a first optical element may be provided, as illustrated in FIG. 9. The concave mirror 29 reflects the illumination light toward the liquid crystal panel 27 so that the illumination light converges as convergent light in a direction corresponding to the X direction. Even in this configuration, similar effects to those of the embodiment described above can be achieved.

Not only the first to third variations described above but also further variations can be made to the configurations of the condenser lens 23, the first lenticular lens 24, and the second lenticular lens 25.

For example, in the embodiment described above, the cylindrical lens portions 24a and 24b of the first lenticular lens 24 are arranged to intersect each other, but the cylindrical lens portions 24a and 24b are not limited thereto and may extend in the same direction.

Figure 8:
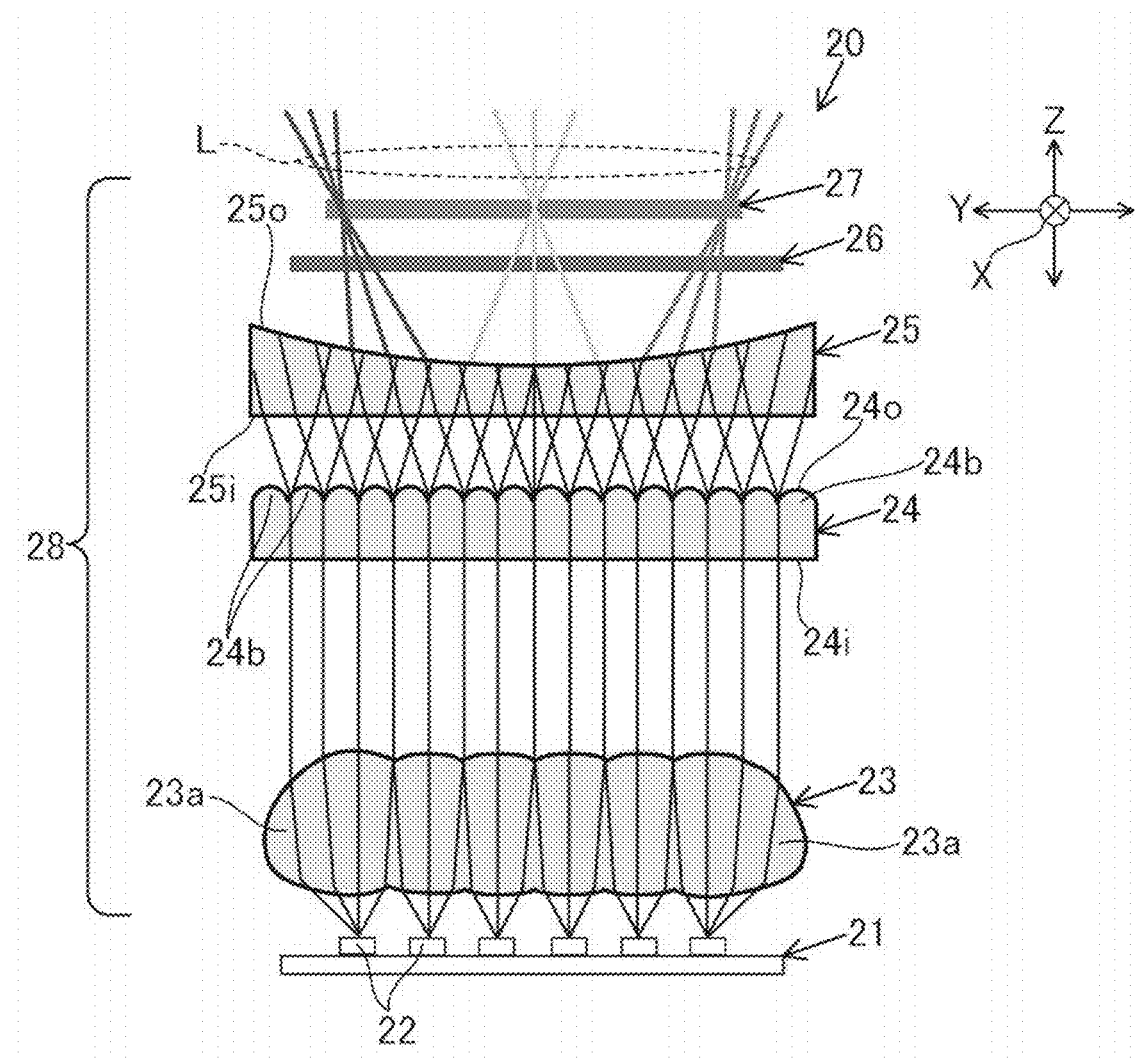
FIG. 8 is a plan view of the display unit illustrating the light path according to the another variation of the present disclosure.

For example, cylindrical lens portions extending in the Y direction and aligned in the X direction may be formed on both the incident surface 24i and the light emitting surface 24o of the first lenticular lens 24 illustrated in FIG. 7, and cylindrical lens portions extending in the X direction and aligned in the Y direction may be formed on the incident surface 25i of the second lenticular lens 25 illustrated in FIG. 8.

For example, two first lenticular lenses 24 may be arranged so as to face each other. A first lenticular lens may include cylindrical lens portions formed to extend in the Y direction and be aligned in the X direction on both an incident surface and a light emitting surface thereof, and a second lenticular lens may include cylindrical lens portions formed to extend in the X direction and be aligned in the Y direction on both an incident surface and a light emitting surface thereof.

In the embodiment described above and in the first variation described above, the second lenticular lens 25 may be provided to be reversed so that the incident surface 25i and the light emitting surface 25o of the second lenticular lens 25 are reversely arranged.

The diffuser 26 in the embodiment described above can be omitted.

In the embodiment described above, the second mirror 12 may be configured to be rotatable around a rotation axis along a vehicle width direction by a mirror driving unit. By rotation of the second mirror 12 around the rotation axis, an irradiation position of the display light L to the viewer 1 can be adjusted in the height direction.

Although, in the embodiment described above, the head-up display device 100 is mounted on a vehicle, the head-up display device 100 is not limited thereto but may be mounted on some other vehicle, such as an airplane, a ship, or the like. The projection target member is not limited to the windshield 201 but may be a dedicated combiner.

DESCRIPTION OF REFERENCE NUMERALS

1 Viewer
11 First mirror 11a, 12a Reflecting surface
12 Second mirror
20 Display unit
21 Light source substrate
22 Light source
23 Condenser lens
23a Convex lens portion
24 First lenticular lens, second lens
24a, 24b Cylindrical lens portion
24i, 25i Incident surface
24o, 25o Light emitting surface
25 Second lenticular lens
26 Diffuser
27 Liquid crystal panel
28 Lighting optical system
29 Concave mirror
30 Case
31 Translucent window material
100 Head-up display device
200 Vehicle
201 Windshield
α Convergent angle
β, θ divergent angle
L Display light
V Virtual image
Cr Cross point
Lq Light beam path

The invention claimed is:

1. A head-up display device comprising:
a light source that emits light;
a liquid crystal panel that receives the light from the light source and emits display light;
a first mirror that reflects the display light from the liquid crystal panel and causes the reflected display light to cross in a crossing direction at a cross point;
a second mirror that reflects the display light that has been reflected at the first mirror and has passed the cross point;
a first optical element that converges the light from the light source to cause the display light to reach the first mirror in a converged state;
a second optical element that substantially collimates light emitted from the light source; and
a third optical element that diverges the light substantially collimated by the second optical element and then emits the substantially collimated light to the first optical element,
wherein an incident surface and a light emitting surface of the third optical element are formed in a cylindrical lens array shape extending in mutually intersecting directions.

2. The head-up display device according to claim 1,
wherein the first optical element includes a convex lens surface that has positive power and converges the light from the light source.

* * * * *